(12) United States Patent
Graf

(10) Patent No.: US 12,510,767 B2
(45) Date of Patent: Dec. 30, 2025

(54) OPHTHALMIC LENS FOR EYEGLASSES AND METHOD FOR PRODUCING AN OPHTHALMIC LENS

(71) Applicant: Robert Bosch GmbH, Stuttgart (DE)

(72) Inventor: Tobias Graf, Überlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 373 days.

(21) Appl. No.: 18/006,610

(22) PCT Filed: Sep. 22, 2021

(86) PCT No.: PCT/EP2021/075997
§ 371 (c)(1),
(2) Date: Jan. 24, 2023

(87) PCT Pub. No.: WO2022/106095
PCT Pub. Date: May 27, 2022

(65) Prior Publication Data
US 2023/0273457 A1    Aug. 31, 2023

(30) Foreign Application Priority Data
Nov. 18, 2020   (DE) .................... 10 2020 214 478.8

(51) Int. Cl.
*G02C 7/02*        (2006.01)
(52) U.S. Cl.
CPC .................................. *G02C 7/022* (2013.01)
(58) Field of Classification Search
CPC ..... G02C 7/022; B33Y 80/00; G02B 27/0172
USPC .................................................. 351/159.01
See application file for complete search history.

(56) References Cited

U.S. PATENT DOCUMENTS

| | | | | |
|---|---|---|---|---|
| 6,318,857 | B1 * | 11/2001 | Shirayanagi | G02C 7/085 351/158 |
| 10,216,271 | B2 * | 2/2019 | Itani | G09G 3/003 |
| 11,442,275 | B2 * | 9/2022 | Schuck | G02B 27/0179 |
| 2012/0113092 | A1 | 5/2012 | Bar-Zeev et al. | |
| 2012/0127062 | A1 | 5/2012 | Bar-Zeev et al. | |
| 2016/0041390 | A1 | 2/2016 | Poon et al. | |

(Continued)

FOREIGN PATENT DOCUMENTS

| | | |
|---|---|---|
| DE | 102014110961 A1 | 2/2016 |
| WO | 2012088478 A1 | 6/2012 |

(Continued)

OTHER PUBLICATIONS

International Search Report for PCT/EP2021/075997, Issued Jan. 4, 2022.

*Primary Examiner* — William R Alexander
(74) *Attorney, Agent, or Firm* — NORTON ROSE FULBRIGHT US LLP

(57) ABSTRACT

An ophthalmic lens for eyeglasses. The lens has an eye side, a surroundings side, a waveguide, a first compensation layer, a second compensation layer, a first outer layer, and a second outer layer. The waveguide is formed to conduct and couple out projection light in the direction of the eye side, in order to display a virtual object. The first compensation layer has a first refractive power, the second compensation layer has a second refractive power, the first outer layer has a third refractive power, and the second outer layer has a fourth refractive power.

11 Claims, 4 Drawing Sheets

(56) References Cited

U.S. PATENT DOCUMENTS

| | | | |
|---|---|---|---|
| 2017/0045742 A1 | 2/2017 | Greenhalgh et al. | |
| 2017/0168307 A1* | 6/2017 | Itani | G02B 27/0172 |
| 2020/0331219 A1* | 10/2020 | Van Heugten | G02C 7/083 |
| 2021/0141212 A1* | 5/2021 | Jacoby | G02B 27/0172 |
| 2022/0197032 A1* | 6/2022 | Schuck | G02B 30/34 |

FOREIGN PATENT DOCUMENTS

| | | |
|---|---|---|
| WO | 2019186132 A2 | 10/2019 |
| WO | 2020173342 A1 | 9/2020 |

\* cited by examiner

OPHTHALMIC LENS FOR EYEGLASSES AND METHOD FOR PRODUCING AN OPHTHALMIC LENS

FIELD

The present invention relates to a device and a method for an ophthalmic lens for eyeglasses.

BACKGROUND INFORMATION

German Patent Application No. DE 10 2014 110 961 B4 describes smart glasses in which a spectacle glass of the smart glasses is used as a waveguide to insert a virtual image into a visual range of the wearer of the glasses.

SUMMARY

The approach presented here provides an ophthalmic lens for eyeglasses and a method for producing an ophthalmic lens. Advantageous further developments of and improvements to the lens set forth are made possible by the measures disclosed herein.

Advantages achievable with the approach presented include that a lens is created for eyeglasses that both pre-compensates and corrects coupled-in projection light and corrects ambient light passing completely through the lens, in order to correct the visual acuity for a user of the eyeglasses.

According to an example embodiment of the present invention, an ophthalmic lens for eyeglasses is introduced, the lens having a side facing the eye, a side facing the surroundings, a waveguide, a first compensation layer, a second compensation layer, a first outer layer and a second outer layer. The waveguide is formed to conduct and couple out projection light in the direction of the eye side in order to display a virtual object. The first compensation layer has a first refractive power, is curved, and is disposed on a side of the waveguide facing the eye side. The second compensation layer has a second refractive power, is arched, and is disposed on a side of the waveguide facing the surroundings side. The first outer layer has a third refractive power, is curved, and is disposed on a side of the second compensation layer facing the surroundings side. The second outer layer has a fourth refractive power, is curved, and is disposed on a side of the first compensation layer facing the eye side.

According to an example embodiment of the present invention, the eyeglasses may be AR (augmented reality) glasses, thus glasses which are designed to display virtual image contents in a field of view of a person wearing the AR glasses. Such virtual image contents may be used to expand the field of view of the user. The projection light may be light, generated with the aid of a projection device, for displaying the virtual image contents, and may be conducted into the waveguide. The projection device may be part of the AR glasses. The eye side is to be understood as a side of the lens facing the eye of the user during use of the eyeglasses. The surroundings side is to be understood as a side of the lens facing away from the eye during use of the eyeglasses. The first compensation layer may be disposed directly on a surface of the waveguide facing the eye side and/or may have a surface facing the eye side and arched toward the eye side. The second compensation layer may be disposed directly on a surface of the waveguide facing the surroundings side and/or may have a surface facing the surroundings side and arched toward the surroundings side. The first outer layer may be disposed directly on a surface of the second compensation layer facing the surroundings side and/or may have a surface facing the eye side and curving away from the eye side. A surface of the first outer layer facing the surroundings side may be arched toward the surroundings side. The second outer layer may be disposed directly on a surface of the first compensation layer facing the eye side and/or may have a surface facing the eye side and curving away from the eye side. A surface of the second outer layer facing the surroundings side may be curved away from the first compensation layer. The second outer layer may be formed to bring about a visual-acuity pre-correction for light emerging from the waveguide. The first compensation layer disposed between the waveguide and the second outer layer may be used advantageously to pre-compensate for effects of the visual-acuity correction on the projection light from a projection device.

According to an example embodiment of the present invention, the first compensation layer and the second compensation layer and/or the waveguide may have an identical refractive index. It may thus be ensured that ambient light passing completely through the lens and/or projection light emerging from the waveguide is not refracted.

According to one specific embodiment of the present invention, the first outer layer and the second outer layer may have a lower refractive index than the first compensation layer, second compensation layer and/or the waveguide. A lower refractive index permits the visual-acuity correction.

Mutually opposite surfaces of the waveguide may be flat. Thus, a customary flat waveguide may be used in the manufacturing process.

Moreover, it is advantageous if, according to one specific embodiment of the present invention, the first refractive power and the second refractive power are opposite. The refractive powers may thus neutralize one another. In this case, the lens shapes of the compensation layers may be formed to be mutually compensating, so that the ambient light which passes through the entire lens is not deviated by the compensation layers, thus, no visual-acuity correction takes place through the compensation layers.

According to an example embodiment of the present invention, the first compensation layer and second outer layer may be formed to correct a defective vision of a user of the eyeglasses with respect to the projection light coupled out from the waveguide. Thus, virtual objects projected with the aid of the projection light are able to be perceived correctly, especially sharply, by the user in spite of defective vision, without further aid.

According to one specific embodiment of the present invention, the first outer layer and second outer layer may be formed to correct the defective vision of a user of the AR glasses with respect to the ambient light passing through the entire lens.

This makes it possible for the real surroundings to be perceived correctly, e.g., sharply, by the user, in spite of defective vision.

The first compensation layer, the second compensation layer and/or the waveguide may have a refractive index between n=1.6 and n>=2. The first outer layer and second outer layer may have a refractive index between 1.3 n and 1.7 n. For example, the first compensation layer, the second compensation layer and/or the waveguide may have a refractive index of 1.8 n and/or the first outer layer and second outer layer may have a refractive index of 1.5 n. A practical implementation of a desired visual-acuity correction may thus be realized.

According to an example embodiment of the present invention, a pair of AR glasses has at least one lens in one of the variants described above and a projection device for providing the projection light. During use by a user, such AR glasses are able both to pre-compensate and correct coupled-in projection light and to correct ambient light passing completely through the lens, in order to implement a visual-acuity correction for the user of the AR glasses.

According to an example embodiment of the present invention, a method for producing an ophthalmic lens having an eye side and a surroundings side for eyeglasses has a step of providing, a step of applying a first compensation layer, a step of applying a second compensation layer, a step of applying a first outer layer and a step of applying a second outer layer. In the step of providing, a waveguide is provided for conducting and coupling out projection light in the direction of the eye side in order to display a virtual object. In the step of applying the first compensation layer, a curved first compensation layer having a first refractive power is applied to a side of the waveguide facing the eye side. In the step of applying the second compensation layer, an arched second compensation layer having a second refractive power is applied to a side of the waveguide facing the surroundings side. In the step of applying the first outer layer, a curved first outer layer having a third refractive power is applied to a side of the second compensation layer facing the surroundings side. In the step of applying the second outer layer, a curved second outer layer having a fourth refractive power is applied to a side of the first compensation layer facing the eye side, in order to produce the ophthalmic lens.

For example, this method may be implemented in software or hardware or in a mixed form of software and hardware, e.g., in a control unit.

According to an example embodiment of the present invention, in at least one of the steps of applying or in all steps of applying described above, the first compensation layer, the second compensation layer, the first outer layer and/or the second outer layer may be printed using a 3D printer. The method may also have a step of printing the waveguide, in which the waveguide is printed utilizing a 3D printer.

Exemplary embodiments of the present invention disclosed herein are represented in the figures and explained in greater detail in the following description.

DETAILED DESCRIPTION OF EXAMPLE EMBODIMENTS

Figure 1:
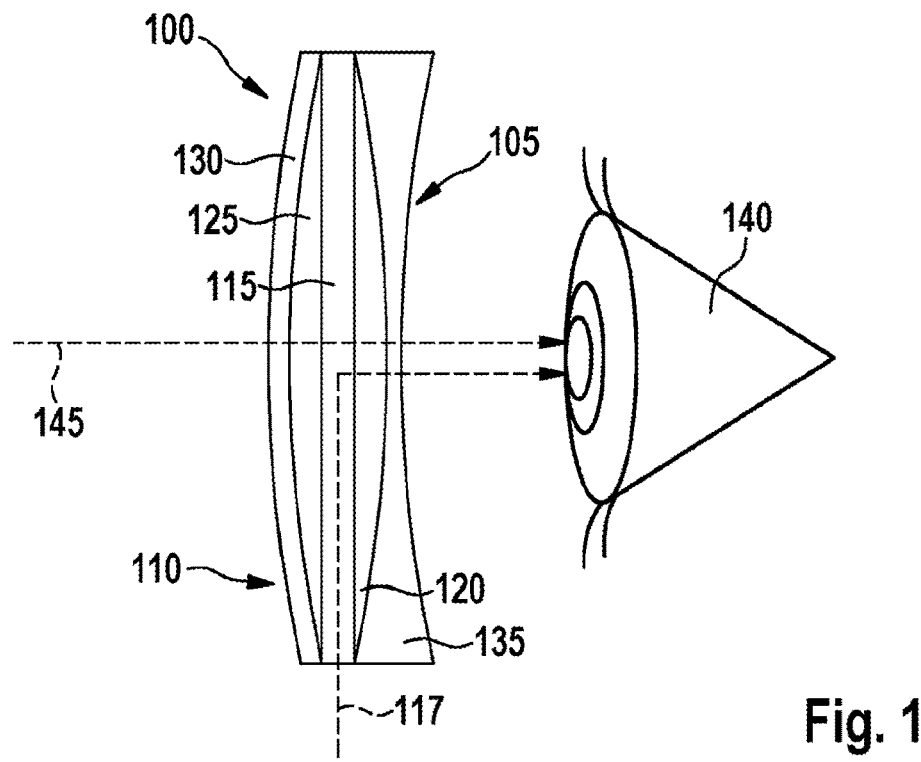
FIG. 1 shows a lateral cross-sectional representation of an ophthalmic lens for eyeglasses according to one exemplary embodiment of the present invention.

In the following description of advantageous exemplary embodiments of the present approach, the same or similar reference numerals are used for the similarly functioning elements shown in the various figures, a repeated description of these elements being omitted.

FIG. 1 shows a lateral cross-sectional representation of an ophthalmic lens 100 for eyeglasses according to one exemplary embodiment.

Lens 100 has an eye side 105, a surroundings side 110, a waveguide 115, a first compensation layer 120, a second compensation layer 125, a first outer layer 130 and a second outer layer 135. Waveguide 115 is formed to conduct and couple out projection light 117 in the direction of eye side 105, in order to display a virtual object. First compensation layer 120 has a first refractive power, is curved, and is disposed on a side of waveguide 115 facing eye side 105. Second compensation layer 125 has a second refractive power, is arched, and is disposed on a side of waveguide 115 facing surroundings side 110. First outer layer 130 has a third refractive power, is curved, and is disposed on a side of second compensation layer 125 facing surroundings side 110. Second outer layer 135 has a fourth refractive power, is curved, and is disposed on a side of first compensation layer 120 facing eye side 105.

Eye side 105 is to be understood as a side of lens 100 facing eye 140 of a user during use of the eyeglasses. Surroundings side 110 is to be understood as a side of lens 100 facing away from eye 140 during use of the eyeglasses. According to this exemplary embodiment, first compensation layer 120 is disposed directly on a surface of waveguide 115 facing eye side 105 and/or has a surface facing eye side 105 and arched toward eye side 105. According to this exemplary embodiment, second compensation layer 125 is disposed directly on a surface of waveguide 115 facing surroundings side 110 and/or has a surface facing surroundings side 110 and arched toward surroundings side 110. First outer layer 130 according to this exemplary embodiment is disposed directly on a surface of second compensation layer 125 facing surroundings side 110 and/or has a surface facing eye side 105 and curving away from eye side 105. According to this exemplary embodiment, a surface of first outer layer 130 facing surroundings side 110 is arched toward surroundings side 110. Second outer layer 135 according to this exemplary embodiment is disposed directly on a surface of first compensation layer 120 facing eye side 105 and/or has a surface facing eye side 105 and curving away from eye side 105. According to this exemplary embodiment, a surface of second outer layer 135 facing surroundings side 110 is curved away from first compensation layer 120. Second outer layer 135 according to this exemplary embodiment is formed to bring about a visual-acuity pre-correction for light 117, 145 emerging from waveguide 115. According to this exemplary embodiment, first compensation layer 120 disposed between waveguide 115 and second outer layer 135 is formed advantageously to pre-compensate for effects of the visual-acuity correction on projection light 117 from a projection device.

According to this exemplary embodiment, first compensation layer 120 and second compensation layer 125 and/or waveguide 115 have an identical refractive index. First outer layer 130 and second outer layer 135 according to this exemplary embodiment have a lower refractive index than first compensation layer 120, second compensation layer 125 and/or waveguide 115. According to this exemplary embodiment, mutually opposite surfaces of waveguide 115 are flat. The first refractive power and the second refractive power are opposite according to this exemplary embodiment. In this context, the lens shapes of compensation layers 120, 125 according to this exemplary embodiment are formed to be mutually compensating, so that ambient light 145 which passes through entire lens 100 is not deviated by compensation layers 120, 125, thus, no visual-acuity correction takes place through compensation layers 120, 125

When passing through lens 100, ambient light 145 coming from the surroundings enters into first outer layer 130, after passing through first outer layer 130, enters into second compensation layer 125, after passing through second compensation layer 125, enters into waveguide 115, after passing through waveguide 115, enters into first compensation layer 120, after passing through first compensation layer 120, enters into second outer layer 135, and after passing through second outer layer 135, exits from lens 100 in the direction of eye 140.

In contrast, after emerging from waveguide 115, projection light 117 enters into first compensation layer 120, after passing through first compensation layer 120, enters into second outer layer 135, and after passing through second outer layer 135, exits from lens 100 in the direction of eye 140.

According to one exemplary embodiment, the lens shapes of compensation layers 120, 125 are formed to be mutually compensating, so that ambient light 145 which passes through entire lens 100 is not deviated by compensation layers 120, 125, thus, no visual-acuity correction takes place through compensation layers 120, 125.

According to this exemplary embodiment, first compensation layer 120 and second outer layer 135 are formed to correct a defective vision of a user of the eyeglasses with respect to projection light 117 coupled out from waveguide 115. First outer layer 130 and second outer layer 135 according to this exemplary embodiment are formed to correct the defective vision of the user of the eyeglasses with respect to ambient light 145 passing through entire lens 100.

According to this exemplary embodiment, first compensation layer 120, second compensation layer 125 and/or waveguide 115 have a refractive index between 1.6 n and 2 n and/or first outer layer 130 and second outer layer 135 have a refractive index between 1.3 n and 1.7 n. For example, first compensation layer 120, second compensation layer 125 and/or waveguide 115 according to this exemplary embodiment have a refractive index of 1.8 n and/or first outer layer 130 and second outer layer 135 have a refractive index of 1.5 n.

Figure 4:
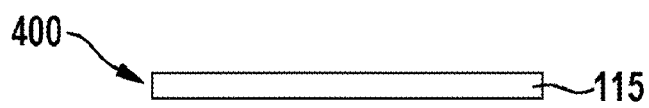
FIG. 4 shows a lateral cross-sectional representation of an ophthalmic lens in the case of a manufacturing process according to one exemplary embodiment of the present invention.
Figure 4:
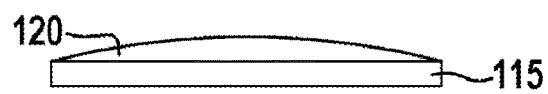
Figure 4:
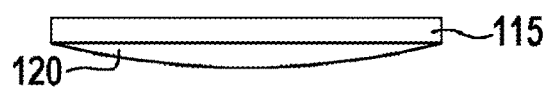
Figure 4:
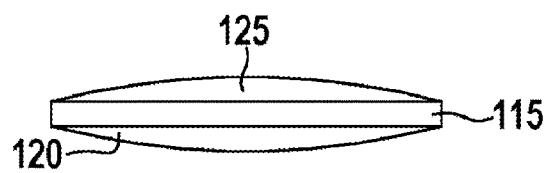
Figure 4:
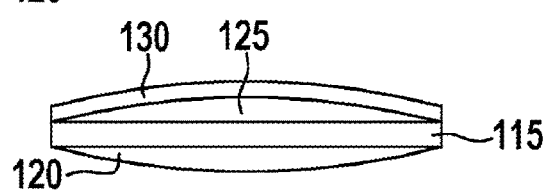
Figure 4:
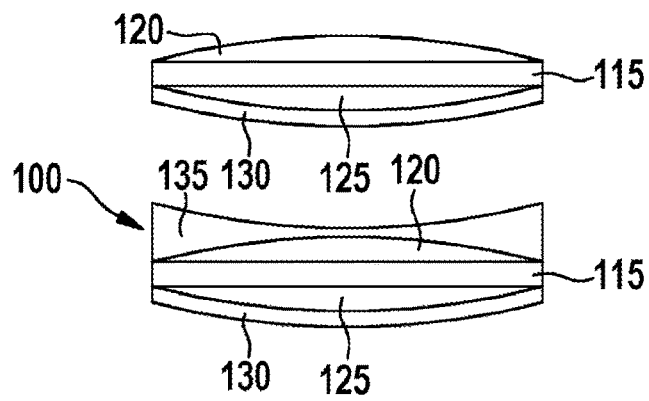
Figure 5:
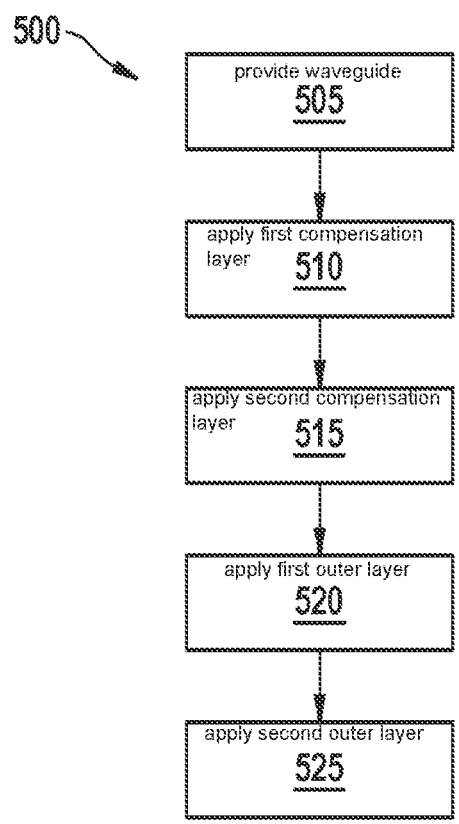
FIG. 5 shows a flowchart of a method for producing an ophthalmic lens according to one exemplary embodiment of the present invention.

The approach presented here relates to an ophthalmic lens 100 having an integrated waveguide 115 for AR glasses, as well as a method for configuring and producing such a lens 100, which is described in FIGS. 4 and 5. Lens 100 presented here advantageously permits a refractive wavefront pre-compensation in waveguide-based AR glasses with ophthalmic lenses. To that end, in addition, waveguide 115 is coated, so that projection light 117, guided within waveguide 115 and coupled out of waveguide 115 in order to insert a virtual image, is also compensated in terms of the defective vision.

The integration of geometrically optical waveguide 115, which may also be referred to as lightguide, into an ophthalmic lens 100 for an AR system leads to aberrations of the nominally planar wavefronts emerging from waveguide 115. According to one exemplary embodiment, the effect described above is used deliberately in order, by applying first compensation layer 120 in the form of a curved substrate layer on waveguide 115, which may also be referred to as "waveguide module" or waveguide component," to achieve a refractive effect on the side facing the user (eye side), which shifts a virtual image distance from infinite to a finite distance. On an opposite side (world side) facing away from the user, the resulting refractive effect for incident ambient light 145 is compensated for with the aid of a second lens structure, second compensation layer 125.

According to this exemplary embodiment, waveguide 115 is based on total internal reflection, TIR for short, and is formed to guide light in combination with diffractive structures for coupling in projection light 117 from an image-generating unit, to guide and manipulate the light paths, for example, to duplicate the exit-pupil expansion, EPE for short, and to couple out projection light 117 in the field of view of the user in order to display virtual contents in superimposition with the image of the surroundings, compare augmented reality, AR or virtual reality, VR, mixed reality, MR, extended reality, XR. According to one exemplary embodiment, waveguide 115 is formed as a glass substrate having a comparatively high refractive index.

If flat waveguide 115 is not embedded into a plane-parallel substrate, but rather, as according to this exemplary embodiment for the correction of defective vision, is embedded into outer layers 130, 135 having curved surfaces, then the emergent flat waves in each exit pupil, or even within one exit pupil, impinge at different angles and distances on the curved air-glass interface surface.

In the case of lens 100 presented here, the goal is to pre-compensate for aberrations developing in the emergent wavefronts in the design of the grating structure for the coupling out of the light. According to one exemplary embodiment, this is accomplished by utilizing several materials having different refractive indices in order, according to one exemplary embodiment, with the aid of a 3D printing process, to embed into a lens an additional lens function only for projection light 117 emerging from waveguide 115.

Additional frames, e.g., as clip-in, with ophthalmic lenses for correcting visual acuity are not necessary for correcting a defective vision of the user of a waveguide-based AR system, thanks to lens 100 presented here.

Ophthalmic lens 100 contains waveguide 115 having a high refractive index, e.g., n=1.8 according to this exemplary embodiment, embedded into a substrate having a comparable refractive index according to this exemplary embodiment. According to one exemplary embodiment, this substrate is applied in the form of compensation layers 120, 125 in mutually compensating lens shape on a front side and backside of waveguide 115 with the aid of 3D printing. Using a further material, e.g., n=1.5, the front side and backside have been printed in the form of outer layers 130, 135 for the lens curvatures of ophthalmic lenses 100, so that the defective vision is able to be corrected for ambient light 145, while the curvature of the innermost lens surface is pre-compensated on eye side 105 for projection light 117 emerging from waveguide 115.

The lens maker equation reads in general form:

$$D = \frac{1}{f} = \frac{n-n_0}{n_0}\left(\frac{1}{R_1} - \frac{1}{R_1} + \frac{(n-n_0)d}{nR_1R_2}\right)$$

That is, the refractive power of a lens is calculated from the radii of curvature $R_1$ and $R_2$, the refractive indices of the lens material and of the surroundings n and $n_0$, respectively, and the thickness d.

For example, if $R_1 \approx R_2$ and $d \approx 0$, then the total refractive power is:

$$\frac{1}{f} \approx 0.$$

The refractive power of a lens combination is calculated from the sum of the individual refractive powers and the distance.

$$\frac{1}{f} = \frac{1}{f_1} + \frac{1}{f_2} - \frac{d}{f_1 f_2}$$

If now $f_1 \approx f_2$ and $d \approx 0$, then the total refractive power is:

$$\frac{1}{f} \approx 0.$$

A basic principle of the approach presented here is that with the aid of 3D printing, a waveguide component is provided on the eye side with a lens surface in the form of first compensation layer 120, compensation layer 120 pre-compensating for the later effect of the curvature to correct the defective vision, on projection light 117 emerging from waveguide 115. The effect on ambient light 145 is neutralized by a corresponding lens in the form of second compensation layer 125 on the world side; to that end, compare the refractive power of lens combinations and the lens maker formula.

Figure 2:
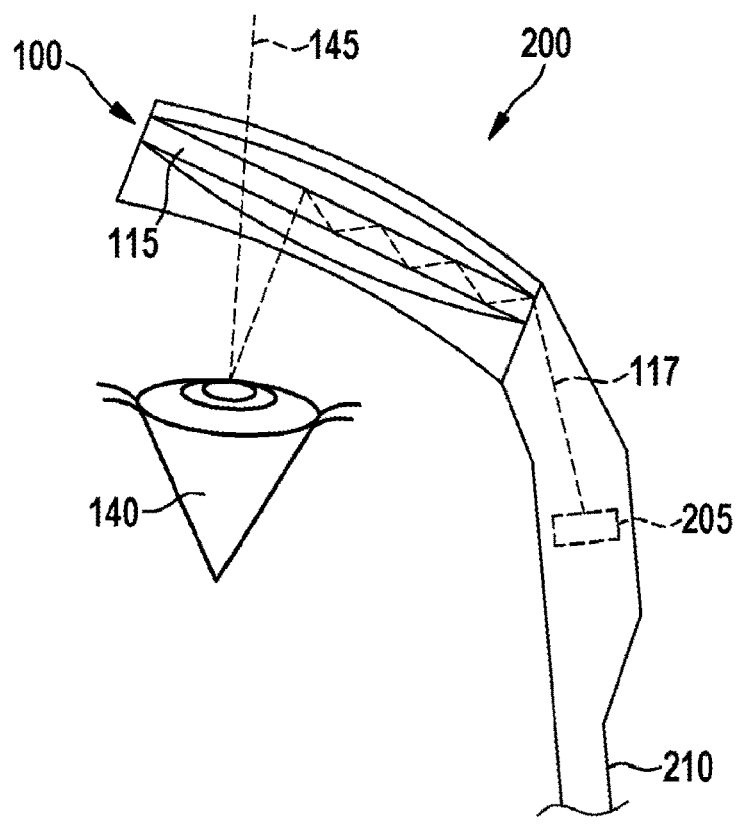
FIG. 2 shows a cross-sectional representation of AR glasses having an ophthalmic lens according to one exemplary embodiment of the present invention.

FIG. 2 shows a cross-sectional representation of AR glasses 200 having an ophthalmic lens 100 according to one exemplary embodiment. It may be lens 100 described in FIG. 1. Only one half of AR-glasses 200 is shown in FIG. 2, viewed from above.

AR glasses 200 have at least one of lenses 100 and, according to this exemplary embodiment, a projection device 205 for providing projection light 117. According to this exemplary embodiment, projection device 205 is located in an earpiece 210 of AR-glasses 200. AR-glasses 200 are designed to display virtual image contents in a field of view of a person wearing AR-glasses 200. According to this exemplary embodiment, projection light 117 is projected onto or into waveguide 115, is guided through waveguide 115 and is coupled out into the field of view, here the pupil of eye 140, of the user.

Figure 3:
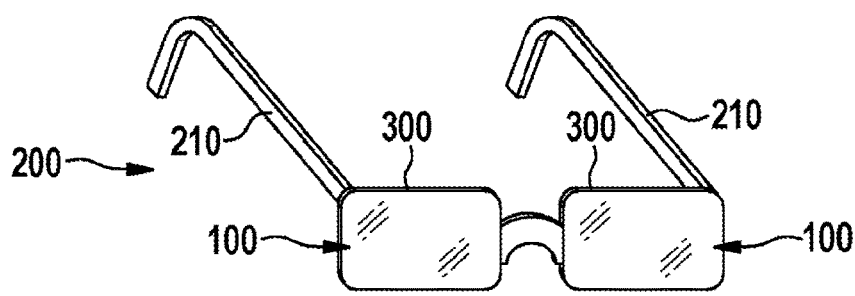
FIG. 3 shows a schematic representation of AR glasses according to one exemplary embodiment of the present invention.

FIG. 3 shows a schematic representation of AR-glasses 200 according to one exemplary embodiment. They may be AR-glasses 200 described with the aid of FIG. 2. According to this exemplary embodiment, each of eyeglass lenses 300 of AR-glasses 200 assigned to one eye each of the user is formed of at least one of lenses 100.

According to an alternative exemplary embodiment, AR-glasses 200 are any other smart glasses, or other eyeglasses based on waveguides that, for example, should additionally be able to correct a defective vision of the user.

FIG. 4 shows a lateral cross-sectional representation of an ophthalmic lens 100 in the case of a manufacturing process 400 according to one exemplary embodiment. It may be one of lenses 100 described on the basis of one of the preceding figures.

Shown in FIG. 4 is an illustration of an embedding process with the aid of 3D printing in seven consecutive manufacturing stages (1), (2), (2a), (3), (4), (4a), (5) depicted one below the other:

The starting point in first manufacturing stage (1) is preferably flat waveguide 115.

In second manufacturing stage (2), a lens surface in the form of first compensation layer 120 made of a material with the same refractive index was applied on waveguide 115, in order to pre-compensate for the effects of the visual-acuity correction on the light of the display system. Optionally, according to one exemplary embodiment, waveguide 115 with first compensation layer 120 was thereupon flipped over in a first intermediate stage (2a).

In third manufacturing stage (3), on the second side of waveguide 115, the refractive effect for the ambient light was neutralized with a further lens surface in the form of second compensation layer 125.

In fourth manufacturing stage (4) and fifth manufacturing stage (5), using a second material, e.g., with lower refractive index, the front side and backside were each provided with curvatures for correcting visual acuity. In doing so, in fourth manufacturing stage (4), first outer layer 130 was applied to second compensation layer 125, and in fifth manufacturing stage (5), second outer layer 135 was applied to first compensation layer 120. Between fourth manufacturing stage (4) and fifth manufacturing stage (5), the still incomplete lens was flipped over optionally in a second intermediate stage (4a) prior to applying second outer layer 135. After applying second outer layer 135 in fifth manufacturing stage (5), lens 100 is ready for use.

FIG. 5 shows a flowchart of a method 500 for producing an ophthalmic lens having an eye side and a surroundings side for eyeglasses according to one exemplary embodiment. The lens may be the lens described in one of the preceding figures.

Method 500 has a step 505 of providing, a step 510 of applying a first compensation layer, a step 515 of applying a second compensation layer, a step 520 of applying a first outer layer and a step 525 of applying a second outer layer.

In step 505 of providing, a waveguide is provided for conducting and coupling out projection light in the direction of the eye side in order to display a virtual object.

In step 510 of applying the first compensation layer, a curved first compensation layer having a first refractive power is applied to a side of the waveguide facing the eye side.

In step 515 of applying the second compensation layer, an arched second compensation layer having a second refractive power is applied to a side of the waveguide facing the surroundings side.

In step 520 of applying the first outer layer, a curved first outer layer having a third refractive power is applied to a side of the second compensation layer facing the surroundings side.

In step 525 of applying the second outer layer, a curved second outer layer having a fourth refractive power is applied to a side of the first compensation layer facing the eye side, in order to produce the ophthalmic lens.

According to one exemplary embodiment, in at least one of the steps 510, 515, 520, 525 of applying or in all steps 510, 515, 520, 525 of applying described above, the first compensation layer, the second compensation layer, the first outer layer and/or the second outer layer is/are printed using a 3D printer. According to one exemplary embodiment, method 500 also has a step of printing the waveguide, in which the waveguide is printed utilizing a 3D printer.

Figure 6:
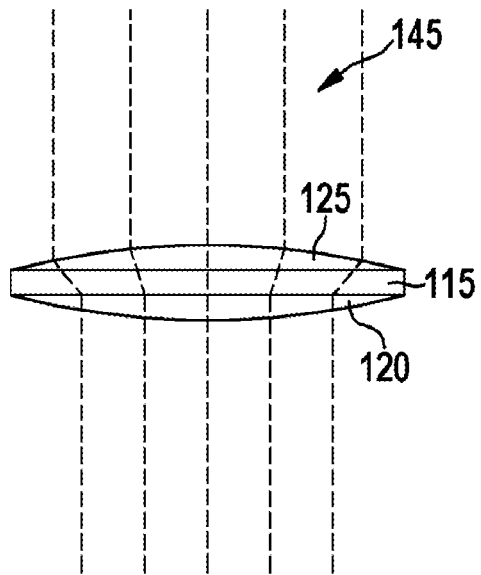
FIG. 6 shows a lateral cross-sectional representation of compensation layers for an ophthalmic lens according to one exemplary embodiment of the present invention.

FIG. 6 shows a lateral cross-sectional representation of compensation layers 120, 125 for an ophthalmic lens according to one exemplary embodiment. They may be compensation layers 120, 125 described in one of FIGS. 1 through 5. In order to illustrate the compensation of ambient light 145 upon first passing through second compensation layer 125, then waveguide 115 and finally first compensation layer 120, the outer layers which bring about the visual-acuity correction are not shown. According to this exemplary embodiment, ambient light 145 exits in parallel-running light beams from first compensation layer 120 toward the eye side. In order to be neutral for the surroundings, the phases of compensation layers 120, 125 according to this exemplary embodiment, that is, the radii of curvature, offset each other in the algebraic sign. FIG. 6 shows that parallel light beams from real objects, thus, ambient light 145, remain parallel after passing through inner compensation layers 120, 125. According to one exemplary embodiment, a compensation of a refractive power in the virtual image path on the eye side occurs with the aid of a conjugate lens on the surroundings side, which may also be referred to as "world side."

Figure 7:
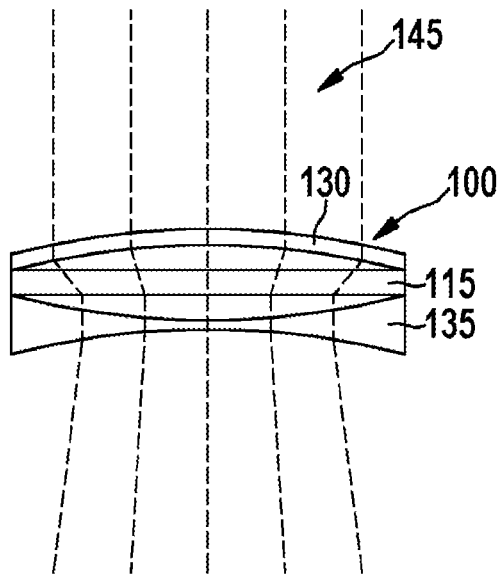
FIG. 7 shows a lateral cross-sectional representation of an ophthalmic lens according to one exemplary embodiment of the present invention.

FIG. 7 shows a lateral cross-sectional representation of an ophthalmic lens 100 according to one exemplary embodiment. It may be ophthalmic lens 100 described in one of the preceding figures. According to this exemplary embodiment, ambient light 145 passes first through first outer layer 130, then the second compensation layer, then waveguide 115, then the first compensation layer and finally exits through second outer layer 135 out of lens 100. According to this exemplary embodiment, ambient light 145 exits in widening light beams from second outer layer 135 toward the eye side. Therefore, according to this exemplary embodiment, parallel light beams of ambient light 145 are defocused in order to correct nearsightedness, or according to an alternative exemplary embodiment, are focused in order to correct farsightedness. Disregarding the lens thickness, the conjugate/arched lens pair corresponds to complex conjugate/arched phase terms. In this case, a pre-compensation of a curved surface for the defective-vision correction is realized with the aid of an embedded conjugate lens pair in the form of compensation layers 120, 125.

Figure 8:
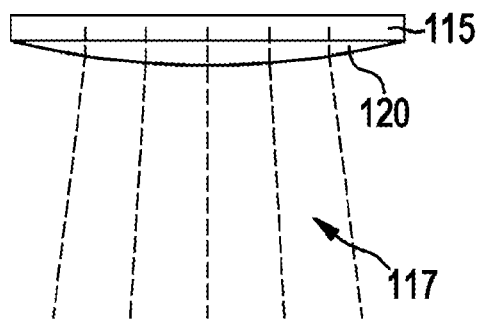
FIG. 8 shows a lateral cross-sectional representation of a first compensation layer of an ophthalmic lens according to one exemplary embodiment of the present invention.

FIG. 8 shows a lateral cross-sectional representation of a first compensation layer 120 of an ophthalmic lens according to one exemplary embodiment. It may be first compensation layer 120 described in one of the preceding figures. Without the second outer layer, according to this exemplary embodiment, after passing through waveguide 115, projection light 117 exits as widening light beams out of first compensation layer 120 toward the eye side. For virtual images, the inner compensation lens on the eye side, thus first compensation layer 120, is used for the pre-compensation of the inner lens curvature for the vision correction.

Figure 9:
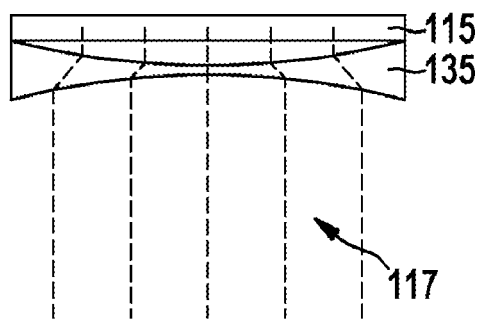
FIG. 9 shows a lateral cross-sectional representation of an eye side of an ophthalmic lens according to one exemplary embodiment of the present invention.

FIG. 9 shows a lateral cross-sectional representation of an eye side of an ophthalmic lens according to one exemplary embodiment. It may be the ophthalmic lens described in one of the preceding figures. Thanks to second outer layer 135, projection light 117 according to this exemplary embodiment, after passing first through waveguide 115, then first compensation layer 120 and finally second outer layer 135, exits in parallel-running light beams out of second outer layer 135 toward the eye side.

What is claimed is:

1. An ophthalmic lens for eyeglasses, the lens having an eye side and a surroundings side, and the lens comprising:
   a waveguide configured to conduct and couple out projection light in a direction of the eye side, to display a virtual object;
   a curved first compensation layer having a first refractive power, disposed on a side of the waveguide facing the eye side;
   an arched second compensation layer having a second refractive power, disposed on a side of the waveguide facing the surroundings side;
   a curved first outer layer having a third refractive power, disposed on a side of the second compensation layer facing the surroundings side; and
   a curved second outer layer having a fourth refractive power, disposed on a side of the first compensation layer facing the eye side.

2. The lens as recited in claim 1, wherein the first compensation layer, and the second compensation layer and/or the waveguide have an identical refractive index.

3. The lens as recited in claim 1, wherein mutually opposite surfaces of the waveguide are flat.

4. The lens as recited in claim 1, wherein the first refractive power and the second refractive power are opposite to one another.

5. The lens as recited in claim 1, wherein the first compensation layer and second outer layer are formed to correct a defective vision of a user of the eyeglasses with respect to the projection light coupled out from the waveguide.

6. The lens as recited in claim 1, wherein the first outer layer and second outer layer are formed to correct a defective vision of a user of the eyeglasses with respect to ambient light passing through the entire lens.

7. The lens as recited in claim 1, wherein: (i) the first compensation layer, and/or the second compensation layer and/or the waveguide have a refractive index between 1.6 n and 2 n, and/or (ii) the first outer layer and second outer layer have a refractive index between 1.3 n und 1.7 n.

8. An ophthalmic lens for eyeglasses, the lens having an eye side and a surroundings side, and the lens comprising:
   a waveguide configured to conduct and couple out projection light in a direction of the eye side, to display a virtual object;
   a curved first compensation layer having a first refractive power, disposed on a side of the waveguide facing the eye side;
   an arched second compensation layer having a second refractive power, disposed on a side of the waveguide facing the surroundings side;
   a curved first outer layer having a third refractive power, disposed on a side of the second compensation layer facing the surroundings side; and
   a curved second outer layer having a fourth refractive power, disposed on a side of the first compensation layer facing the eye side,
   wherein the first outer layer and the second outer layer have a lower refractive index than the first compensation layer, and/or the second compensation layer and/or the waveguide.

9. AR-glasses, comprising:
at least one lens having an eye side and a surroundings side, and the lens including:
- a waveguide configured to conduct and couple out projection light in a direction of the eye side, to display a virtual object,
- a curved first compensation layer having a first refractive power, disposed on a side of the waveguide facing the eye side,
- an arched second compensation layer having a second refractive power, disposed on a side of the waveguide facing the surroundings side,
- a curved first outer layer having a third refractive power, disposed on a side of the second compensation layer facing the surroundings side, and
- a curved second outer layer having a fourth refractive power, disposed on a side of the first compensation layer facing the eye side; and a projection device configured to provide the projection light.

10. A method for producing an ophthalmic lens for eyeglasses, the lens having an eye side and a surroundings side, and the method comprising the following steps:

providing a waveguide configured to conduct and couple out projection light in a direction of the eye side, to display a virtual object;

applying a curved first compensation layer having a first refractive power to a side of the waveguide facing the eye side;

applying an arched second compensation layer having a second refractive power to a side of the waveguide facing the surroundings side;

applying a curved first outer layer having a third refractive power to a side of the second compensation layer facing the surroundings side; and applying a curved second outer layer having a fourth refractive power to a side of the first compensation layer facing the eye side, to produce the ophthalmic lens.

11. The method as recited in claim 10, wherein in at least one of the applying steps, the first compensation layer, and/or the second compensation layer, and/or the first outer layer and/or the second outer layer is printed utilizing a 3D printer.

* * * * *